United States Patent [19]

Garnett

[11] Patent Number: 5,380,104
[45] Date of Patent: Jan. 10, 1995

[54] BEARINGS FOR ROLLERS

[75] Inventor: David M. Garnett, Ilkley, United Kingdom

[73] Assignee: BNL Limited, Knaresborough, United Kingdom

[21] Appl. No.: 87,689

[22] PCT Filed: Jan. 14, 1992

[86] PCT No.: PCT/GB92/00070
§ 371 Date: Jul. 9, 1993
§ 102(e) Date: Jul. 9, 1993

[87] PCT Pub. No.: WO92/13204
PCT Pub. Date: Aug. 6, 1992

[30] Foreign Application Priority Data

Jan. 15, 1991 [GB] United Kingdom ............... 9100772

[51] Int. Cl.6 ..................... F16C 13/00; F16C 33/80
[52] U.S. Cl. ............................. 384/546; 384/480
[58] Field of Search ............... 384/480, 546, 547; 193/37

[56] References Cited

U.S. PATENT DOCUMENTS

| | | | |
|---|---|---|---|
| 1,362,910 | 12/1920 | Zoeller et al. | 384/546 |
| 2,190,336 | 2/1940 | Olson | 384/546 |
| 4,606,659 | 8/1986 | Hogan | 384/518 |

FOREIGN PATENT DOCUMENTS

| | | |
|---|---|---|
| 0432311 | 6/1991 | European Pat. Off. . |
| 2059012 | 4/1981 | United Kingdom . |
| 2089938 | 6/1982 | United Kingdom . |

Primary Examiner—Thomas R. Hannon
Attorney, Agent, or Firm—Zarley, McKee, Thomte, Voorhees & Sease

[57] ABSTRACT

A roller bearing comprises inner and outer cup-shaped members which interfit and respectively have races on which balls run enabling the members to rotate one relative to another. The outer cup shaped member is for plugging into the end of a roller sleeve to seal the interior thereof from moisture ingress.

1 Claim, 1 Drawing Sheet

BEARINGS FOR ROLLERS

This invention relates to bearings for rollers and the like, and provides an improved bearing structure for overcoming a disadvantage which applies in industrial applications, in particular in food handling and manufacturing plants, but which clearly will have wider application.

In food factories, for the handling and/or manufacture of foodstuff, it is common to use what is sometimes referred to as roller decking. Roller decking comprises a plurality of rotatably supported rollers which lie parallel and in spaced relationship and define a surface for the supporting of articles of foodstuff so that the articles can be conveyed across the decking by rotation of the rollers for example so as to move away from or to processing machinery, or to move from location to location of the plant. The rollers may be arranged in an inclined plane so that the food articles will travel thereover by virtue of gravity, or in some cases the rollers may be driven for the propulsion of the articles. Roller decking is of course used in non-food installations.

A roller of a roller decking comprises essentially a cylindrical portion in the form of a sleeve of plastics or metallic material, and the ends of the sleeve receive roller element bearings comprising inner and outer races with rolling elements therebtween such elements being for example balls or cylinders. The roller bearings usually have shafts extending therefrom by which they are mounted for example on supporting framework forming part of the roller decking, whereby the rollers are mounted for rotation about their axes.

A problem with the rollers is that especially if they are utilised in a damp or wet environment, there is a tendency for water and/or particles to collect inside the roller sleeve, leading to the collection of trapped deposits which in turn lead to the breeding of bacteria which is undesirable as it can constitute a health hazard.

The present invention seeks to provide a roller bearing for use in roller decking, which overcomes this disadvantage.

In accordance with the invention in a general aspect thereof a roller bearing suitable for use in a roller of roller decking, comprises inner and outer races with rolling elements therebetween, the outer race being in the form of a blanking cup suitable for fitting into the end of a sleeve, and the inner race being provided with or for connection to a mounting shaft extending away from the end of the sleeve in which the roller bearing is to be received.

By virtue of using a blanking cup as the outer race, an effective means for preventing the ingress of materials and liquids into the sleeve through the roller bearing is provided, whereby the abovementioned difficulty regarding the breeding of bacteria is avoided.

The inner race preferably also is in the form of a cup having a central bore for receiving the said shaft, and in the assembled roller decking, the bottom of said bore for the shaft preferably receives a spring whereby, when two of such bearings are used for the support of a roller or roller decking, the roller will be displacable against spring action for removal of same from the decking for replacement and repair.

The inner and outer races preferably are of moulded plastics construction, machined if necessary, and the rolling elements preferably are steel balls arranged in equiangular relationship around the axis of the bearing, and held in such relationship by means of a plastics roller bearing cage.

An embodiment of the invention will now be described, by way of example, with reference to the accompanying diagrammatic drawings, wherein.

Figure 1:
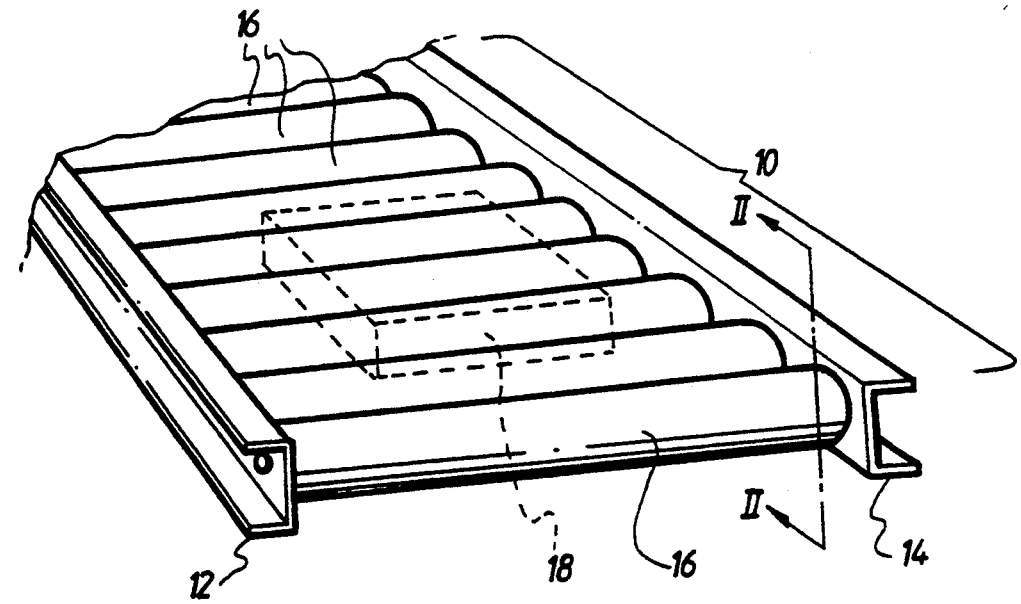
FIG. 1 is a diagrammatic perspective view of a section of roller decking.

Referring to the drawings, a section of roller decking is indicated by the reference numeral 10, and the decking will be seen to comprise side rails 12 and 14 of channel sectioned angle iron forming part of the decking frame, between which extend a plurality of parallel, spaced and freely rotatable rollers 16. The decking illustrated is of the gravity type insofar as the plane which contains the rollers (which are identical) is inclined, so that articles 18 to be transported by the roller decking in fact move down the decking under gravity, turning the rollers about their axes as the articles proceed.

Figure 2:
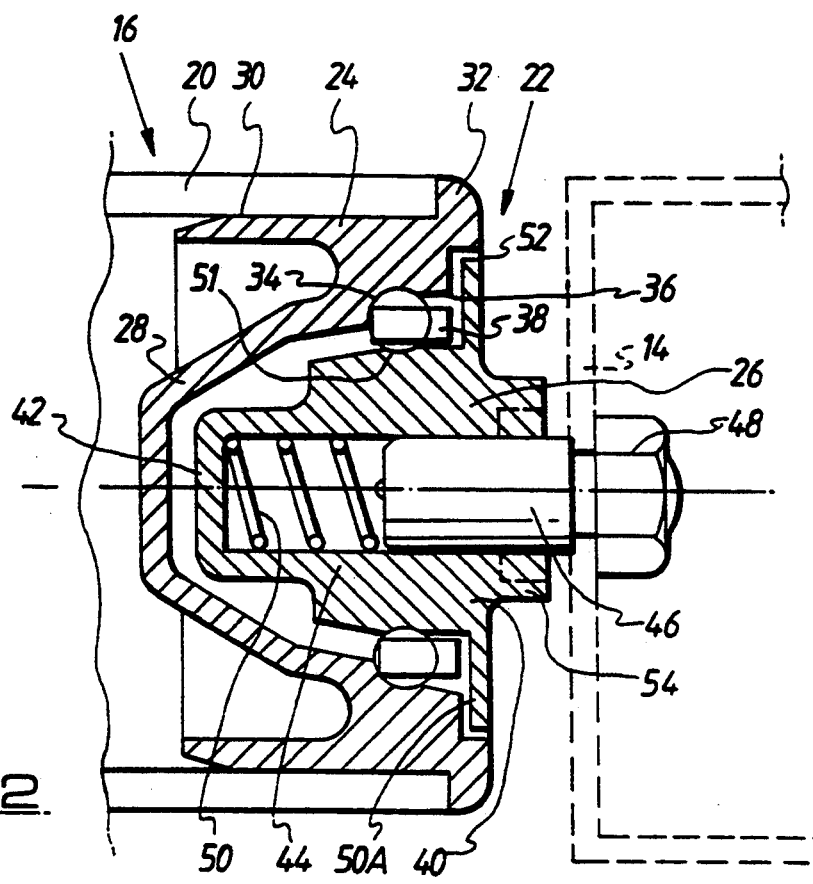
FIG. 2 is a sectional elevation to an enlarged scale taken through an end of one of the rollers of the decking shown in FIG. 1, the section being taken on the line II—II in FIG. 1.

The present invention is concerned with the roller bearings which are located at the ends of the rollers 16 and enable each roller to rotate about its axis, and therefore reference is now made to FIG. 2 which shows one of these bearings in sectional elevation. The bearing at the other end of the roller is of identical construction.

As shown in FIG. 2, the roller 16 comprises a sleeve 20 of stainless steel, plastics of the like, and the roller bearing 22 is simply a push-fit in the end of the sleeve 20.

The roller bearing 22 comprises an outer bearing race 24, and an inner bearing race 26. The outer bearing race 24 is in the form of a cup 28 which blanks off the interior of the sleeve 20 from the surrounding atmosphere. This prevents the ingress of any moisture or other material into the interior of the sleeve 20 which could subsequently form a bacteria trap, and the prevention of such ingress is a significant advantage of the present invention.

The outer race 24 is provided with a cylindrical outer portion 30 having at one end a flange 32 which abuts against the end of the sleeve into which the bearing 22 is inserted as shown in FIG. 2. The outer bearing race 24 is also formed with a bearing race track 34 on which the rolling elements of the roller bearing run, said elements 36 being held in equiangularly arranged relationship by means of a cage 38 of the roller bearing which is of conventional construction and is preferably formed in plastics material. The roller bearing elements 36 are steel balls.

The inner bearing race 40 is also in the form of a closed cup 42, the central recess of same forming a bore 44 in which is received a support spindle 46 of stainless steel which is in fact secured to the adjacent side rail by means of a nut 48. Inside the bore 44 of the inner race 40 is a compression spring 50 which reacts against the base of the bore 44 and at the end of the spindle 46 thereby effecting a resilient support for the roller 16 when in use, it being borne in mind that there is a similar mounting arrangement at the opposite end of the roller.

The inner race is provided with a covering flange portion 50A which extends outward to the outer race as shown so that only a small gap 52 exists between the outer and inner races limiting the extent to which moisture and other material may enter the roller bearing. It also has a race track 51 for the balls 36.

A forwardly projecting portion 54 of the inner race 40 is provided on opposite sides with flats so that it may be engaged by means of an appropriately dimensioned spanner and can be held from rotation whilst the nut 48 on the spindle is being tightened in order to tighten the nut to secure the spindle to the side rail 14. In this connection, the spindle 46 and the bore 44 of the inner race preferably are non-circular.

The outer race 24 in effect provides a complete seal for the interior of the sleeve 20, preventing the formation of bacteria therein and indeed the formation of corrosive spots. The roller bearings, being essentially of plastics material, may be manufactured relatively inexpensively, and if need be can readily be removed and replaced. This is preferable to replacing the roller sleeve especially where such sleeve is of stainless steel.

I claim:

1. A rolling bearing suitable for use in a roller or roller decking, comprising inner and outer races with rolling elements therebetween, the outer race being in the form of a blanking cup suitable for fitting into the end of a sleeve, and the inner race being provided with or for connection to a mounting shaft extending away from the end of the sleeve in which the rolling bearing is to be received, characterized in that the bearing has a flow path between the races enabling water which enters the bearing to flow past the rolling elements without obstruction to drain from the blanking cup.

* * * * *